United States Patent [19]

Spector

[11] Patent Number: 4,835,556

[45] Date of Patent: May 30, 1989

[54] CASSETTE PLAYER AND SLIDE ASSEMBLY

[76] Inventor: Donald Spector, 380 Mountain Rd., Union City, N.J. 07087

[21] Appl. No.: 182,403

[22] Filed: Apr. 18, 1988

[51] Int. Cl.$^4$ ............................................. G03B 31/00
[52] U.S. Cl. ........................................ 353/15; 353/62; 40/457
[58] Field of Search ...................................... 353/15–19, 353/46, 62; 40/455, 457; 350/118; 272/8 P, 8 D, 14, 10

[56] References Cited

U.S. PATENT DOCUMENTS

| | | | |
|---|---|---|---|
| 1,468,547 | 9/1923 | Rummel | 353/18 |
| 3,234,847 | 2/1966 | Williams | 353/15 |
| 3,241,419 | 3/1966 | Gracey | 353/15 |
| 4,055,014 | 10/1977 | Schmidt | 40/457 X |
| 4,107,462 | 8/1978 | Asija | 40/457 X |
| 4,642,710 | 2/1987 | Murtha et al. | 40/457 X |

Primary Examiner—Harry N. Haroian
Attorney, Agent, or Firm—Michael Ebert

[57] ABSTRACT

A cassette player and slide assembly adapted to play back a pre-recorded magnetic tape cassette having a voice recording of a performer whose facial image appears on a transparency slide receivable in a holder attached to the player and provided with a window so that as one hears the performance, one also sees the performer. The player includes an audio amplifier whose output is applied both to a sound reproducer and to a light bulb producing light pulses in synchronism with the reproduced sounds. The slide holder includes a ground glass screen that supports the inserted slide and is back illuminated by the light bulb. The rear surface of the slide is masked to expose only the eyes and mouth of the image whereby only these are intermittently illuminated by the light pulses to impart realistic animation to the performer's image in the course of the played-back performance.

7 Claims, 2 Drawing Sheets

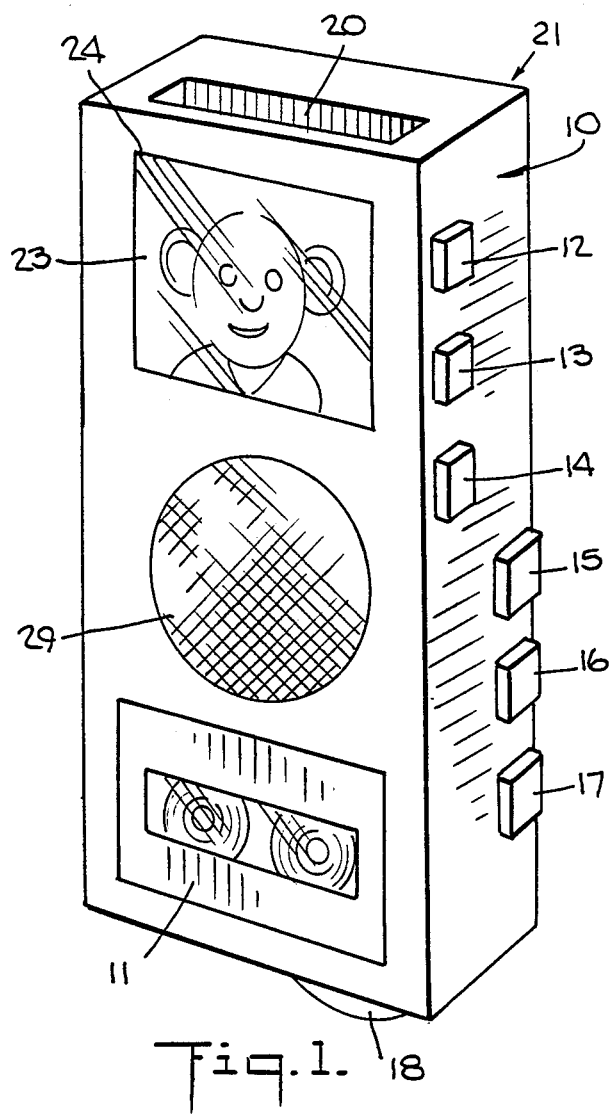
Fig.1.
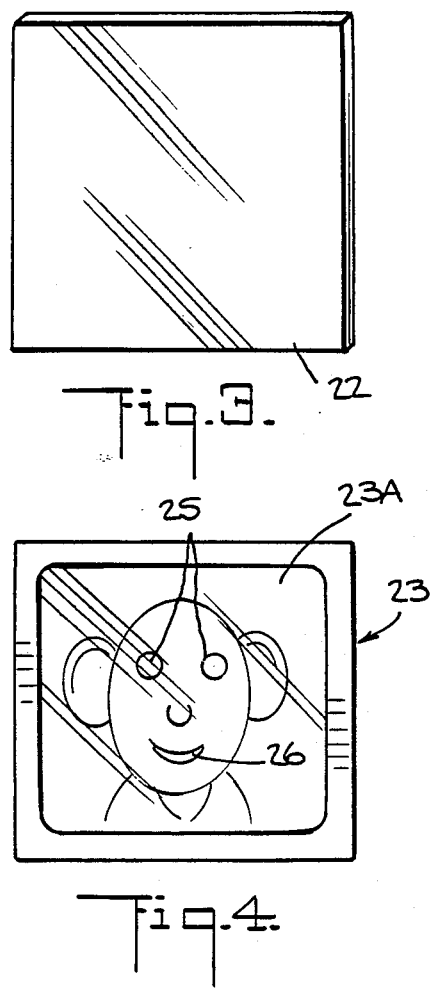
Fig.3.
Fig.4.
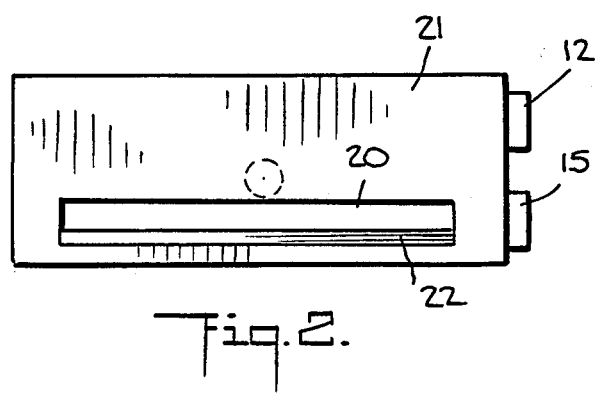
Fig.2.
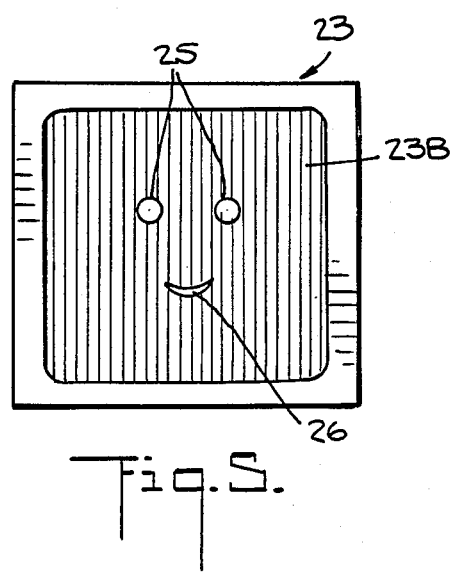
Fig.5.

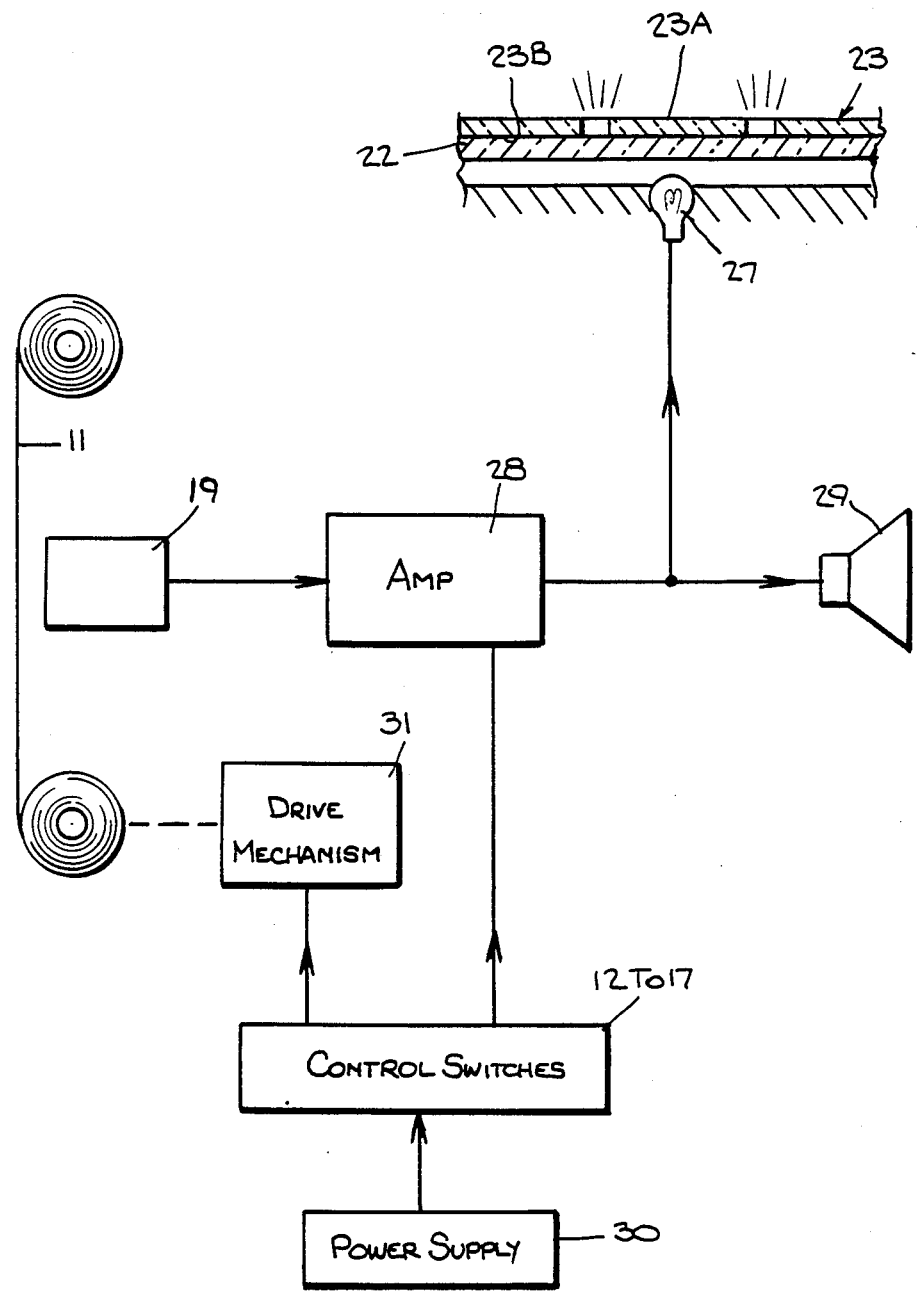

CASSETTE PLAYER AND SLIDE ASSEMBLY

BACKGROUND OF INVENTION

1. Field of Invention

This invention relates generally to players for pre-recorded magnetic tape cassettes, and more particularly to a player of this type having a holder attached thereto to receive a transparency slide carrying a facial image of the performer whose voice is recorded, the eyes and mouth of the image being intermittently illuminated by light pulses in synchronism with the reproduced sounds to impart realistic animation to the image in the course of the played-back performance.

2. Status of Prior Art

In a conventional magnetic tape cassette player, when a cassette is inserted in the player, it is engaged by a drive mechanism causing the tape to be drawn across a magnetic pick-up head that yields audio signals that are amplified and reproduced. The typical player of this type is provided with an eject mechanism making it possible to quickly replace one cassette with another. In recent years, such players have been reduced in size and cost by means of microcassettes which are considerably smaller than standard cassettes, yet provide recordings of good quality. The present invention is applicable to both microcassette and cassette players.

Magnetic tape cassette or microcassette players have become popular with children, for pre-recorded cassettes are now available that tell stories intended for a young audience. These often involve familiar characters or personalities, such as Disney-inspired characters such as Mickey Mouse and Donald Duck, or Big Bird and others included in the cast of the Sesame Street educational TV series. And many recordings are available that are made by singers who cater to the tastes of young children. These songs may be based on nursery rhymes or other verses involving ducks, cats or other animals or cartoon characters.

Before the advent of television when the phonograph and radio were the principal sources of home entertainment, children and adults were accustomed, without any sense of deprivation, to listen to a record or broadcast without seeing the performer. The listeners then depended on their imagination to create an image of the performer. But the fact that one could only hear but not see the performer developed in the same listeners a desire to see the performer. To a small degree, this desire is satisfied in the case of phonograph records whose jackets contain a picture of the performer which the listener can look at while hearing the record.

But in this more advanced age of television when being able to see as well as hear a performer is commonplace, children whose conditioning is molded by watching television find it difficult to just listen to a magnetic tape player, for the child wished to see as well as hear the performer. In an attempt to satisfy this need, my prior patent 4,521,205 discloses a three-dimensional character that is united with a pre-recorded magnetic tape cartridge or cassette which plugs into a tape player. The character in my prior patent is provided with eye and mouth openings covered by translucent elements coupled to internal light guides to a common optical inlet. When the cassette is plugged into the player to effect playback, the character is then in an erect position above the player which acts as a stage for the character. In this position, the optical inlet is then in registration with a light outlet whose bulb is energized by the audio output of the player. As the recorded sound is reproduced by a loudspeaker, the light emitted by the bulb is modulated to produce light pulses which are conveyed by the light guides to the eye and mouth elements to impart animation to the character in synchronism with the reproduced sounds.

The practical drawback of my prior patented cassette player, apart from its relative complexity, is that each cassette is united with a three-dimensional character, thereby ruling out the use of ordinary cassettes. Since there are now commercially available hundreds of pre-recorded cassettes intended for children, each carrying a recording of a different character or performer, it would be prohibitively expensive to unite each of these cassettes to a separate three-dimensional character appropriate to the recording.

SUMMARY OF INVENTION

In view of the foregoing, the main object of this invention is to provide a cassette player and slide assembly having a slide holder adapted to receive a transparency slide carrying a facial image of the performer whose voice is recorded on the cassette.

More particularly, an object of this invention is to provide a holder of the above type in which the eyes and mouth of the image are intermittently illuminated by light pulses in synchronism with the reproduced sounds to impart realistic animation to the image in the course of the played back performance.

Also an object of the invention is to provide an assembly of the above type which makes it possible to supply with each cassette of a performance a slide image of the performer, so that as one inserts the cassette into the player, one then also inserts the slide in the slide holder attached to the player.

Briefly stated, these objects are attained in a cassette player and slide assembly adapted to play back a pre-recorded magnetic tape cassette having a voice recording of a performer whose facial image appears on a transparency slide receivable in a holder attached to the player and provided with a window so that as one hears the performance, one also sees the performer. The player includes an audio amplifier whose output is applied both to a sound reproducer and to a light bulb producing light pulses in synchronism with the reproduced sounds. The slide holder includes a ground glass screen that supports the inserted slide and is back illuminated by the light bulb. The rear surface of the slide is masked to expose only the eyes and mouth of the image whereby only these are intermittently illuminated by the light pulses to impart realistic animation to the performer's image in the course of the played-back performance.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a perspective view of a cassette player and slide assembly in accordance with the invention;

FIG. 2 is an upper end view of the assembly;

FIG. 3 is a separate view of the ground glass screen;

FIG. 4 is a front view of a slide;

FIG. 5 is a rear view of the slide; and

FIG. 6 is a block diagram of the assembly.

DESCRIPTION OF INVENTION

Referring now to FIGS. 1 and 2, a cassette player and slide assembly in accordance with the invention, generally designated by reference numeral 10, is adapted to play back a microcassette 11 having a voice recording of a living performer or personality, or a fanciful character pre-recorded thereon. The microcassette is received in a cavity within the player in which the spools of the cassette engage drive capstans and the tape is then in operative relation to a magnetic playback head. This cavity is covered by a hinged lid which is caused to open when the cassette, then in place in the cavity, is ejected. This is a commonplace arrangement in cassette players.

The assembly is constituted by a slide holder section integral with a cassette player section which, per se, is entirely conventional and includes various control elements 12 to 17, which when actuated, effect an eject/-stop action, a fast forward action, a fast rewind action and other actions typically found in such players. Also included is a volume control 18.

Thus, if one wishes to eject the microcassette then in place and replace it with another, the user presses the eject button. He presses the play button to drive the cassette to effect playback of the recording. If one wishes to return the tape to its start position, the user then presses the fast rewind button. And if one wishes to skip over a portion of the tape recorded to hear the portion that follows, the user presses the fast forward button. The sound taken from the cassette is reproduced by a loudspeaker 29 at a volume level determined by setting volume control 18.

The slide holder section includes a rectangular socket 20 whose entrance is at the upper end of a case 21 housing both the player section and the slide holder section, so that the assembly is integrated. One interior wall of socket 20 is defined by a ground glass plate 22 (shown separately in FIG. 3) acting as a screen which is back illuminated by a light source to be later described. Receivable within socket 20 is a framed transparency slide 23 (shown separately in FIG. 4) containing a facial image of the personality or character whose voice is recorded on the cassette to be played. When slide 23 is fully inserted in socket 20, its rear face 23B lies against screen 22, while its front face 23A is exposed through a rectangular window 24 in the case of the unit.

To give an example of the relationship of the cassette to the slide, if the recording is that of Madonna, the rock star, the facial image on the slide will be that of Madonna. Hence, in packaging cassettes for use with the assembly, the slide and the related cassette are packaged together. The facial image on the slide, regardless of the personality or character depicted thereon, will include in all cases a pair of eyes 25 and an open mouth 26.

The rear 23B of slide 23, as shown in FIG. 5, is rendered opaque by polymeric black masking paint or other suitable means in all regions of the slide except eyes 25 and mouth 26, so that these elements of the image and none other are light permeable. Hence, when slide 23 overlies the back-illuminated screen 22, only the eyes and mouth of the image, as seen through window 24 of the slide holder section, are lit up, the remaining portions of the image being exposed to ambient light and being visible to the viewer.

While a single light source behind the screen at its center serves to illuminate the screen, because it is of ground glass, the light is distributed and internally reflected, so that the screen is substantially illuminated. Because of this, the eyes and mouth of the image are lit up regardless of their sites on the slide which may change from slide to slide.

As shown schematically in FIG. 6, mounted in the case behind screen 22 is a high intensity light-emitting diode, a gas-discharge bulb or other light source 27 capable of being activated and modulated at an audio frequency rate to emit light pulses in accordance therewith. These light pulses back illuminate screen 22.

Light source 27 is connected to the output of a solid-state audio amplifier 28 in the microcassette player section of the assembly. Applied to the input of amplifier 28 are audio signals derived by a magnetic playback head 19 associated with the moving tape of cassette 11.

Thus, the output of amplifier 28 is connected both to light bulb 27 and loudspeaker 29 so that light pulses are generated in synchronism with the performer's voice. The cassette player section further includes a battery power source 30 and a drive mechanism 31 operatively coupled to the capstans for driving the tape spools of the cassette.

When, therefore, a microcassette of a given performer is being played back, the resultant light pulses back-illuminate screen 22 and serve to light up the eyes and open mouth of the slide image overlying the screen. And because these light pulses are synchronized with the reproduced voice of the performer, the eyes and mouth of the performer's image then visible to a viewer through window 24 are caused to flicker accordingly. This acts to effectively animate the image, but not in a random manner; for the animation exactly follows the performer's voice so that the face of the performer appears to be singing or speaking, depending on the nature of the recording.

In practice, the recording need not be the voice of a real life performer or personality but may be that of a popular character such as a Disney-inspired or Sesame Street TV figure; i.e., Mickey Mouse, Donald Duck or Big Bird.

Contrary to normal expectations, I have found that when the facial image on the slide has a mask-free mouth region which is made darker than the region surrounding the open mouth to provide contrast therebetween, and it is the darkened mouth that is intermittently illuminated, though the mouth will not then appear to be as brightly illuminated as it would be in the absence of darkening, the illusion of animation is enhanced. The reason for this is that as a person talks and more or less opens his mouth in doing so, the open mouth as seen by a viewer is actually darker than the area around the lips. Hence, the changing contrast between light and dark produced by the open mouth and the region surrounding the mouth acts to accentuate the sense of animation.

While there has been shown and described a preferred embodiment of a cassette player and slide assembly in accordance with the invention, it will be appreciated that many changes and modifications may be made therein without, however, departing from the essential spirit thereof. Thus, it is not essential that the slide holder section be integrated with the player section, and in practice it may be a separate unit whose light bulb is connected by a cable to the player section.

I claim:
1. A cassette and slide assembly comprising:
A a magnetic tape cassette player section including a magnetic pickup head operatively coupled to the tape of a cassette inserted in the player to produce an audio signal which is applied to the input of an audio amplifier whose output is applied to a sound reproducer;

B a cassette insertable in said player section having pre-recorded thereon the voice of a living performer, a personality or a fanciful character;

C a slide holder section including a socket to receive a transparency slide containing a facial image of the performer, personality or character whose voice is recorded on the cassette, said image having an open mouth and eyes, the rear face of the slide being masked to render it opaque except for said eyes and mouth; a ground glass screen forming a rear wall of the holder section, and a window in a front wall of the holder section to expose the facial image to a viewer, and a light bulb disposed behind the screen and connected to the output of the amplifier in the player section to produce light pulses in synchronism with the played back voice to illuminate the screen and thereby light up the mouth and eyes on the slide to impart animation to the image.

2. An assembly as set forth in claim 1 provided with a case common to said player section and said holder section to integrate said sections.

3. An assembly as set forth in claim 1, wherein said light source is a bulb capable of being activated at an audio frequency rate.

4. An assembly as set forth in claim 3, wherein said bulb is a light-emitting diode.

5. An assembly as set forth in claim 1, wherein said slide is rendered opaque by black polymeric paint coated on the rear face of the slide.

6. An assembly as set forth in claim 1, wherein said mouth is darkened to accentuate contrast between said open mouth and the surrounding region.

7. An assembly as set forth in claim 1, wherein said player section includes play, fast-forward, and rewind controls.

* * * * *